United States Patent [19]

Medamana et al.

[11] Patent Number: 5,181,238
[45] Date of Patent: Jan. 19, 1993

[54] AUTHENTICATED COMMUNICATIONS ACCESS SERVICE

[75] Inventors: John B. Medamana, Matawan; John W. Palmer, Atlantic Highlands; Roy P. Weber, Bridgewater, all of N.J.

[73] Assignee: AT&T Bell Laboratories, Murray Hill, N.J.

[21] Appl. No.: 359,823

[22] Filed: May 31, 1989

[51] Int. Cl.$^5$ .................................... H04M 11/00
[52] U.S. Cl. ................................. 379/95; 379/94; 379/97
[58] Field of Search .............. 379/91, 93, 94, 95, 379/97, 102, 104, 105, 88, 89, 67, 188

[56] References Cited

U.S. PATENT DOCUMENTS

| | | | |
|---|---|---|---|
| 3,920,908 | 11/1975 | Kraus | 179/2 CA |
| 4,162,377 | 7/1979 | Mearns | 179/18 D |
| 4,191,860 | 3/1980 | Weber | 179/18 B |
| 4,277,649 | 7/1981 | Sheinbein | 179/18 |
| 4,559,415 | 12/1985 | Bernard et al. | 379/91 |
| 4,656,624 | 4/1987 | Collins et al. | 379/94 |
| 4,756,020 | 7/1988 | Fodale | 379/91 |
| 4,763,191 | 8/1988 | Gordon et al. | 379/91 |
| 4,791,640 | 12/1988 | Sand | 379/144 |
| 4,815,031 | 3/1989 | Furukawa | 379/95 |
| 4,827,500 | 5/1989 | Binkerd et al. | 379/88 |
| 4,876,717 | 10/1989 | Barron et al. | 379/95 |
| 4,893,330 | 1/1990 | Franco | 379/91 |
| 4,896,346 | 1/1990 | Belfield et al. | 379/89 |
| 4,897,870 | 1/1990 | Golden | 379/144 |
| 4,899,373 | 2/1990 | Lee et al. | 379/144 |

*Primary Examiner*—James L. Dwyer
*Assistant Examiner*—Stella L. Woo
*Attorney, Agent, or Firm*—Werner Ulrich

[57] ABSTRACT

This invention relates to arrangements for providing pre-authenticated access from a caller to a service provider. The caller dials the number of the service provider and subsequently enters a personal identification number (PIN) or other suitable authentication data, and, if necessary, an account number. A data base in the communications carrier verifies that the caller has been authorized to access the service provider and that the PIN is correct for that caller and forwards the call to the service provider only if both checks are satisfied. Only preauthenticated calls are delivered to the service provider, and the caller need only remember one PIN for all the service providers accessed by this arrangement.

27 Claims, 6 Drawing Sheets

AUTHENTICATED COMMUNICATIONS ACCESS SERVICE

TECHNICAL FIELD

This invention relates to arrangements for authenticating calls seeking access to vendor-provided services.

Problem

In recent years many telecommunications systems have become available to provide customers with automated transactional services for banking, bill paying, stockbroker transactions, and the like. The integrity of such services has required that only an authenticated and authorized user access such a service.

In prior art systems, such authorization is obtained by asking a customer to provide a personal identification number in addition to an account number. The personal identification number is typically four digits long and is used in conjunction with the account number or a credit card number to authenticate that the customer alleging to be the owner of an account or credit card is, in fact, the real owner.

A problem of the prior art is that each service provider, such as a bank, must individually provide its own authentication facilities which are generally located on bank premises. Indeed, such facilities are purchased at relatively high costs and are expensive to maintain. Also customers who use a plurality of such services must keep track of a separate personal identification number for each such service.

Solution

The foregoing problem is solved in accordance with an illustrative embodiment of this invention, by the provision of intelligent network facilities as part of a common carrier telephone switching system for facilitating the authentication of customer calls to a plurality of vendor services. The intelligent network comprises a data base system which is populated by all customer identities or account numbers received from a service provider which are to be entitled to access the vendor services. A caller requesting service dials the number of the service provider. For some applications, the caller's telephone number is recognized by automatic number identification (ANI). The call is connected to a toll switching system equipped with a network services complex for requesting the customer to key an account number (where appropriate if the ANI number is not an adequate identification or if the customer is calling from a different telephone station) and a personal identification number (PIN). The toll switching system then accesses a data base to verify if the customer identified by the ANI number and/or the account number, further authenticated by the PIN number or other suitable authentication data, is authorized to access the service provider. If so, the call is connected to the service provider who need not perform further authentication. Advantageously, only authenticated calls are completed to the service provider.

The account number is automatically forwarded to the service provider to ensure that customers who have been authenticated for one account number do not have access to services associated with a different account number. Advantageously, this account number can then also be used for billing customers and for performing transactions associated with that account without requiring the customer to re-identify the account number.

The number dialed by the customer to access the service is translated in the data base to a different telephone number for routing the authenticated call. That latter telephone number is a ("non-dialable") number that is normally rejected in a local switching office, thereby shielding the service provider from receiving unauthenticated calls.

Advantageously, with this arrangement only one personal identification number is required for each customer, since the same data base system is used for storing all the translations associated with each customer. While the data base system may be distributed over several service-provider-group data bases, it is managed as a single logical data base. Advantageously, if a particular customer's personal identification number has been compromised, a single change of the personal identification number can be made which can then be associated with all of that customer's accounts.

This arrangement can be used for any type of restricted access arrangement. For example, if a particular telephone customer, such as a broker, wishes to restrict access to his line to only a few favored customers, the broker could be provided with a service provider data entry, could give his customers the telephone number associated with that account, and give these customers account numbers. Then only those customers having account numbers entered in the data base who can identify themselves with their own personal identification number could get access to this broker. The access can be for voice, for electronic mail, for facsimile, and for computer-generated data.

The account information is forwarded to the vendor. This account information can include data provided by additional translation information obtained from the data base, such as a customer name. In one specific embodiment, this account information is forwarded using the data facilities of an integrated services digital network (ISDN) connection between a common carrier network and the vendor. In this embodiment, the D-channel is used for transmitting this information, using the user to user information (UUI) protocol between the network and the vendor terminal. The UUI is one element of messages sent over the ISDN facilities. This UUI can be used for transmitting information such as the customer's directory number, account number, and, for example, the customer's name if that is stored in the data base.

An auxiliary service provider may be a credit-card service such as VISA or Master Card. For transactions such as shopping from home, verification of the validity of a credit card may be accomplished using an aspect of this invention. Specifically, the data base of the auxiliary service provider is queried to verify the status of, for example, a credit card, prior to completing the authenticated connection to the service provider.

For service providers such as banks which need a very high degree of security in their authentication process, additional authentication devices such as voice recognition devices, callback devices, and data receiver devices for recognizing passwords are provided. Advantageously, such an arrangement provides high security authentication.

Therefore, in accordance with the principles of this invention, in a communications network, in response to receipt of a call from a customer to a service provider, the customer provides additional authentication data;

this data along with data identifying the calling customer and the service provider is used to verify the authorization by the service provider of access by the caller. If authorization is verified then the call is completed to the service provider.

DETAILED DESCRIPTION

Figure 1:
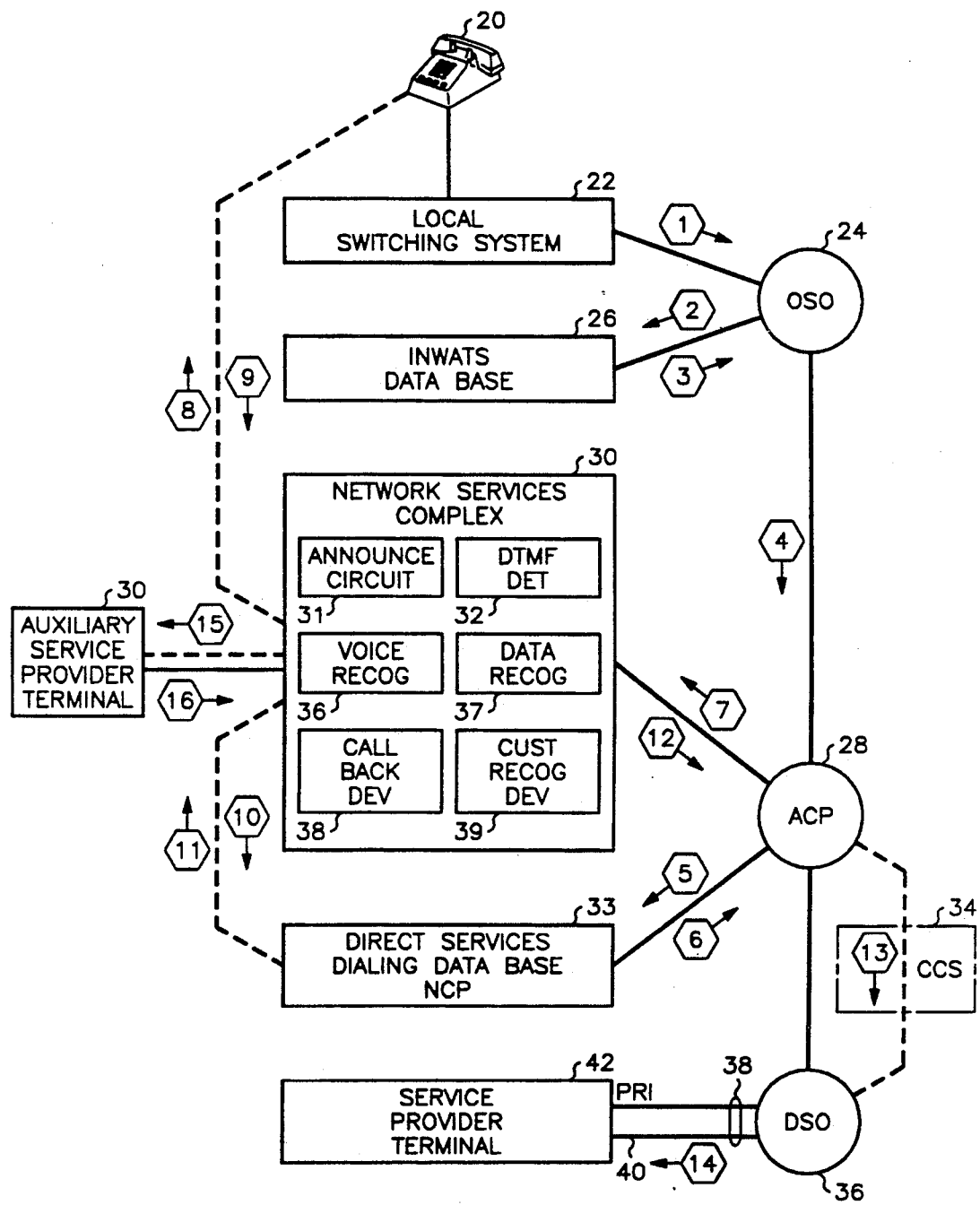
FIG. 1 is a block diagram of an exemplary system for practicing the invention.
Figure 2:
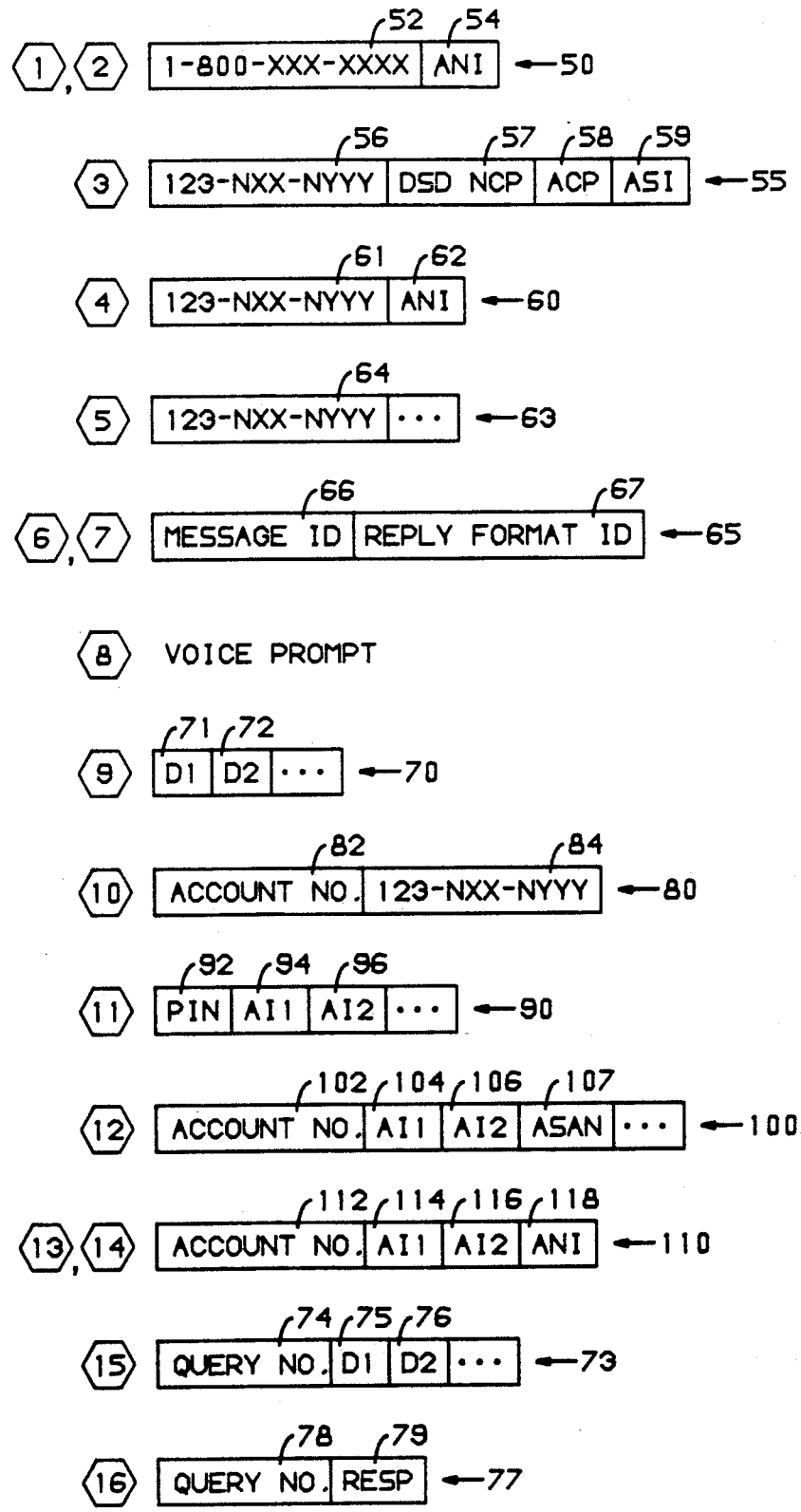
FIG. 2 is a layout of data messages exchanged among the units of FIG. 1.

FIG. 1 is a block diagram of an exemplary embodiment illustrating the principles of this invention, and FIG. 2 details the messages exchanged among the various units of FIG. 1 in setting up a call. A customer at a telephone station 20 wishes to communicate with a terminal 42 of a service provider such as a bank. The station may be equipped with a reader to accept data encoded on a credit card. The customer starts by dialing a number. In this exemplary embodiment, this is an 800 number. 800 service is supported in the AT&T communications network by a flexible routing data base described, for example, in R. P. Weber: U.S. Pat. No. 4,191,860.

More advanced features are described in *The Bell System Technical Journal*, Vol. 61, No. 7, Part 3, September 1982, pages 1573-1816. The number dialed by the customer is 1 followed by 800 followed by a 7-digit number. The number of telephone station 20 is identified by automatic number identification (ANI) facilities of the connected local switching system 22.

Local switching system (switch) 22 routes this call to an originating service office (OSO) 24, a toll office for further processing and routing of this call. In this embodiment, the toll switches are 4 TM switches, described in *The Bell System Technical Journal*, Vol. 56, No. 7, September 1977, pages 1015-1320. In FIG. 1, the n'th message is identified by the number "n" inside a hexagon. Switch 22 sends the first message data block 50 (FIG. 2) to OSO 24. This data block comprises segment 52 which contains the 800 number, and segment 54 which contains the ANI number of the calling customer. This data is passed by OSO 24 to INWATS data base network control point (IND NCP) 26 (FIG. 1), a data base used for routing 800 calls, using the second data message similar to the first. IND NCP 26 translates the incoming information which includes both the dialed 800 number and the identification of the calling customer to a non-dialable directory number (NDDN) for routing the call to the destination service provider terminal 42, and to an identification of a data base, in this case, direct services dialing data base network control point (DSD NCP) 33 which contains data for the destination service provider. The NDDN is a number which cannot be dialed by a customer because such a number would be screened out at the local switch as being a NDDN. This means that the service provider terminal cannot be directly accessed by a customer even if that customer could obtain the unlisted NDDN. This provides secure access to terminal 42, in addition to the authentication service. IND NCP 26 returns the third data message, message 55 (FIG. 2) comprising the NDDN in segment 56, the identification of the DSD NCP in segment 57, the identification of an Action Control Point (ACP) with an appropriately equipped associated Network Services Complex (NSC) in segment 58, and an auxiliary service indicator (ASI) (values 1 or 0) which shows whether or not an auxiliary service provider is involved in completing this transaction, to OSO 24.

OSO 24 then forwards to the toll office, identified in segment 58, the call and a fourth data message 60 (FIG. 2) comprising the NDDN (segment 61) and the ANI (segment 62). This toll office is an action control point 28 (FIG. 1) equipped with a network services complex (NSC) 30. ACP 28 then queries DSD NCP 33 (FIG. 1) with a message 63 (FIG. 2) comprising, in segment 64, the NDDN of service provider terminal 42, to obtain the information necessary for performing the authentication. This data, returned in sixth message 65 (FIG. 2) from DSD NCP 33 to ACP 28, includes a voice announcement message identification (segment 66), and a reply format identification including information such as the number of digits expected from the customer (segment 67).

The data of message 65 is then sent (seventh message) to the NSC 30 which conducts the subsequent exchange (indicated by a dashed line) with the customer at telephone station 20. NSC 30, which comprises announcement circuit 31 and dual tone multifrequency (DTMF) detector 32, prompts the customer with a prompt such as "Enter account number" and "Enter PIN" and detects DTMF digits keyed by the customer in response. In an alternative embodiment, speech recognition units can be provided to recognize spoken numbers from customers with rotary stations as well as keyed digits from customers with DTMF stations. For some service providers, the ANI number will be satisfactory if the customer is calling from his/her own telephone, and it will be satisfactory to enter a signal such as * to indicate that no account number entry is necessary. The announcement would then be preceded by an announcement: "Key* if you are calling from you own telephone." The NSC issues voice prompts (eighth message) and the customer keys the digits shown in block 70, FIG. 2, (ninth message), comprising digit 1 (segment 71), digit 2 (segment 72), etc.

When the account number or equivalent has been received by NSC 30, NSC 30 sends tenth message 80 (FIG. 2) via ACP 28 to DSD NCP 33 (FIG. 1) to request the PIN and additional customer account information. Message 80 includes the account number in segment 82 and the identification of the vendor (the NDDN) in segment 84. DSD NCP 33 translates this information to obtain the PIN and data such as a name and replies to NSC 30 with eleventh message 90 (FIG. 2) which includes the correct PIN in segment 92 and additional account information such as AI 1 (in segment 94), AI 2 (in segment 96), etc.

NSC 30 uses the PIN to check whether the PIN supplied by the customer is correct. If auxiliary service indicator ASI 59 is 0 (i.e., none), NSC 30 sends twelfth message 100 (FIG. 2) to ACP 28, which message contains the account number in segment 102, and the account information previously obtained from DSD NCP 33 in message 90 including AI 1 (in segment 104) and AI 2 (in segment 206). If ASI 59 is 1, NSC prompts the customer to enter an account number (such as a credit card number) for auxiliary service (e.g., credit) verification. The NSC provides voice prompts and the customer keys in additional digits. The NSC will then establish a data link with the auxiliary service provider (such as VISA). (A permanent data link may be maintained with popular services such as VISA and Master Card.) The NSC will transmit block 73, including the account number 75, 76, . . . , (e.g., Credit Card Number) and a query number 74 in message 15 to the auxiliary service provider 35. The query number is a serial number used to match a query and the corresponding reply. The auxiliary service provider will validate the account number and respond to the query with the reply in message 16, block 77, comprising the query number 78 and a response 79 whether or not this transaction can proceed. This response may include (optionally) a dollar amount of credit available in the account. Depending upon the response from the alternate service provider, NSC denies the call or proceeds with call completion. If NSC proceeds with call completion, the alternate-service account number (e.g., credit card number) will be included in segment 107 of message 110 (discussed below).

ACP 28 then sends thirteenth message 110 (FIG. 2) over common channel signaling (CCS) network 34 (FIG. 1) to a destination serving office (DSO) 36 connected to service provider terminal 42. Message 110 includes the account number 112, the account information AI 1 (114), AI 2 (116), and, if desired by the service provider, the customer's telephone identification provided by ANI (118). Message 110 is forwarded (fourteenth message) to service provider terminal 42 (FIG. 1) over the primary rate interface 38. The D-channel 40 of that primary rate interface is used for transmitting message 110.

Note that while the present embodiment shows an ISDN connection to the service provider terminal, the arrangement will also work if the service provider is connected to a local exchange carrier central office or toll office by a non-ISDN loop.

While the use of a personal identification number is a common and satisfactory way of achieving security for many applications, there are some applications in which a higher degree of security is required. For example, a bank accepting funds transfer request messages from customers authenticated by a network, might demand the kind of very high security authentication offered by, for example, an automatic voice recognition arrangement. NSC 30 is therefore provided additionally with a voice recognition unit 36, a data receiver 37, a callback device 38, and a customer recognition device 39. Other types of recognition arrangements can also readily be implemented without deviating from the spirit of this invention. Specifically, an automatic voice recognition unit is used to detect whether the voice characteristics of the caller match the pre-stored (in block 237 of FIG. 3) characteristics of a caller authorized to access the service provider with the given account number. A data receiver 37 is used to detect whether a correct password, stored in block 237, is being supplied by the caller. The data receiver can also be used to detect data from a smart card or hand held password generator whose output can be accepted by an appropriate caller terminal without the possibility of visual or aural eavesdropping. A callback device 38 is used to call back the customer to ensure that the customer is, in fact, calling from an authorized telephone station. Customer recognition device 39 is used for recognizing appropriate keystroke timing to detect a particular "signature" of an authorized user. Keystroke timing should be used along with a PIN to ensure proper security. The keystroke timing is also stored in block 237.

Figure 3:
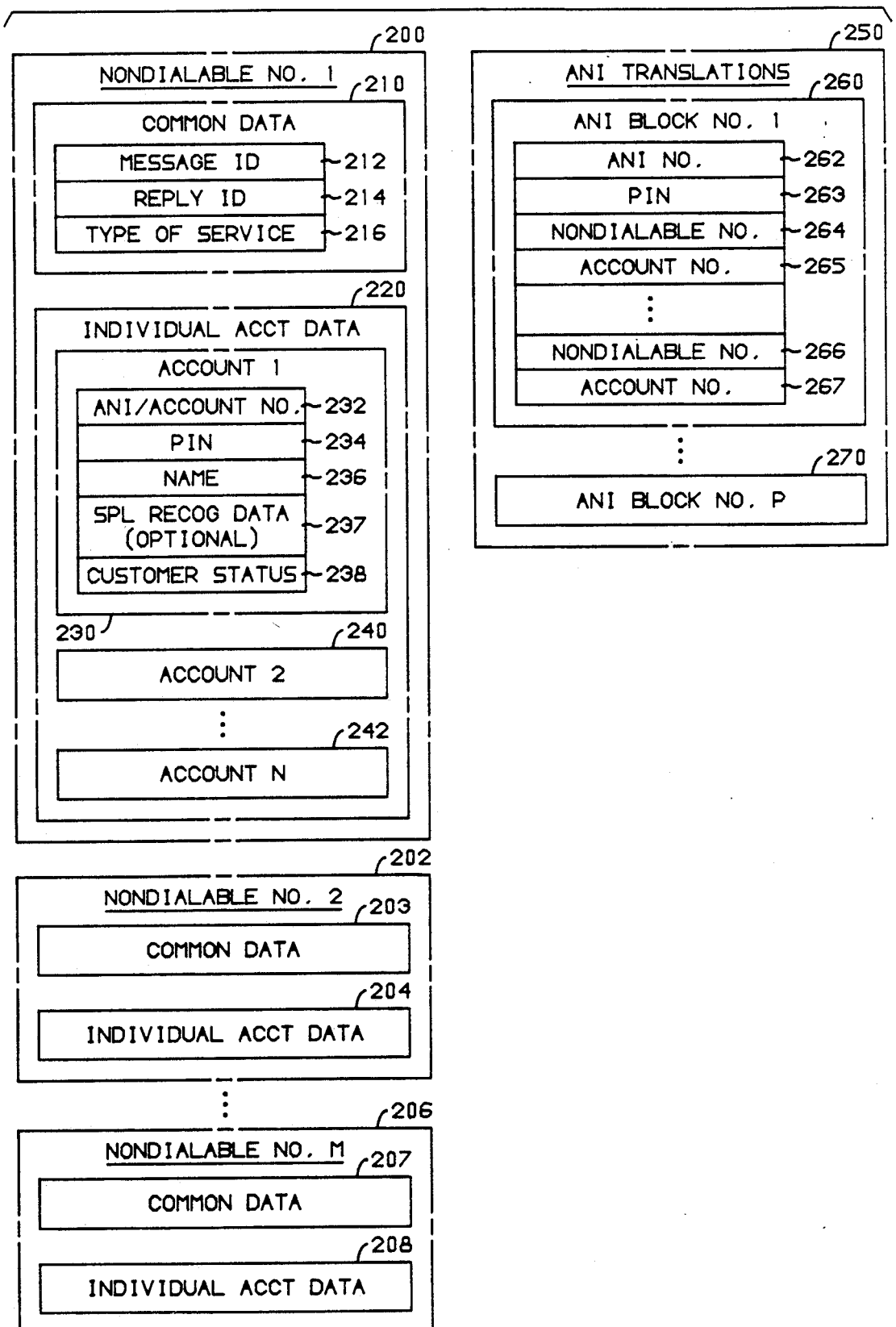
FIG. 3 is a layout of memory of a data base of such a system.

FIG. 3 illustrates the layout of information in DSD NCP 33 required to implement the invention. Shown are a group of blocks 200, 202, . . . , 206. One such block is allocated to each service provider and identified by a non-dialable directory number (NDDN). Block 200 is associated with NDDN 1, block 202 with NDDN 2, . . . , and block 206 is associated with NDDN M. Each such block contains a block of common data for the service provider, and a group of files of data, one file for each account served by the provider. For example, for NDDN 1, block 200, there is a block of common data 210 which includes an identification of the voice message to be returned to the customer in order to elicit the required account information and PIN (segment 212), a reply identifier 214 to indicate the number of digits expected for each segment of the customer's input, and a segment 216 indicating the type of service provided by that vendor. The type of service field might indicate, for example, the number of attempts that a customer would be allowed to try a PIN before the customer is disconnected and whether a record is to be made of any cases where a customer unsuccessfully tries to access the system.

Block 220 contains individual account data for all the accounts served by the service provider and it includes individual files for each account such as file 230 for account 1, file 240 for account 2, . . . , and file 242 for account N. Block 230 for account 1 contains the ANI number and/or the account number for that account (segment 232), the PIN for that account (segment 234) and the name of the customer that owns that account (segment 236), optional special recognition data for accessing special service providers (segment 237), and segment 238 for storing the customer status (for example, delinquent in payment). The ANI number can be used for deriving the account number for situations wherein the customer is calling from his/her own telephone, and for updating all PIN's of a particular customer as identified by an ANI number. The name would be useful in handling customer relations so that a server on a particular service provider terminal could know the name of the calling customer. The customer status might, for example, include delinquency information which when processed in conjunction with the type of service, may indicate the type of announcement or other treatment to be given to that customer.

Also shown in FIG. 3 is another block 250 for storing ANI translations. For each ANI number served by the ACAS, there is one block such as block 260, . . . , 270 for storing an ANI number 262, the corresponding PIN 263, the non-dialable number 264, . . . , 266 of each of the customer's accounts, and the account number 265, . . . , 267 corresponding to a non-dialable number for that customer. The block can be used for accessing all accounts of a customer, for example, for changing a PIN, or for accessing a customer's account if the account records 230, 240, . . . , 242 are searched by account number. Note that a service provider may choose to use the ANI number as the account number, since both require verification via the correct PIN. Note further that the translations of block 250 can be keyed on a social security number or any other account identifier.

Figure 4:
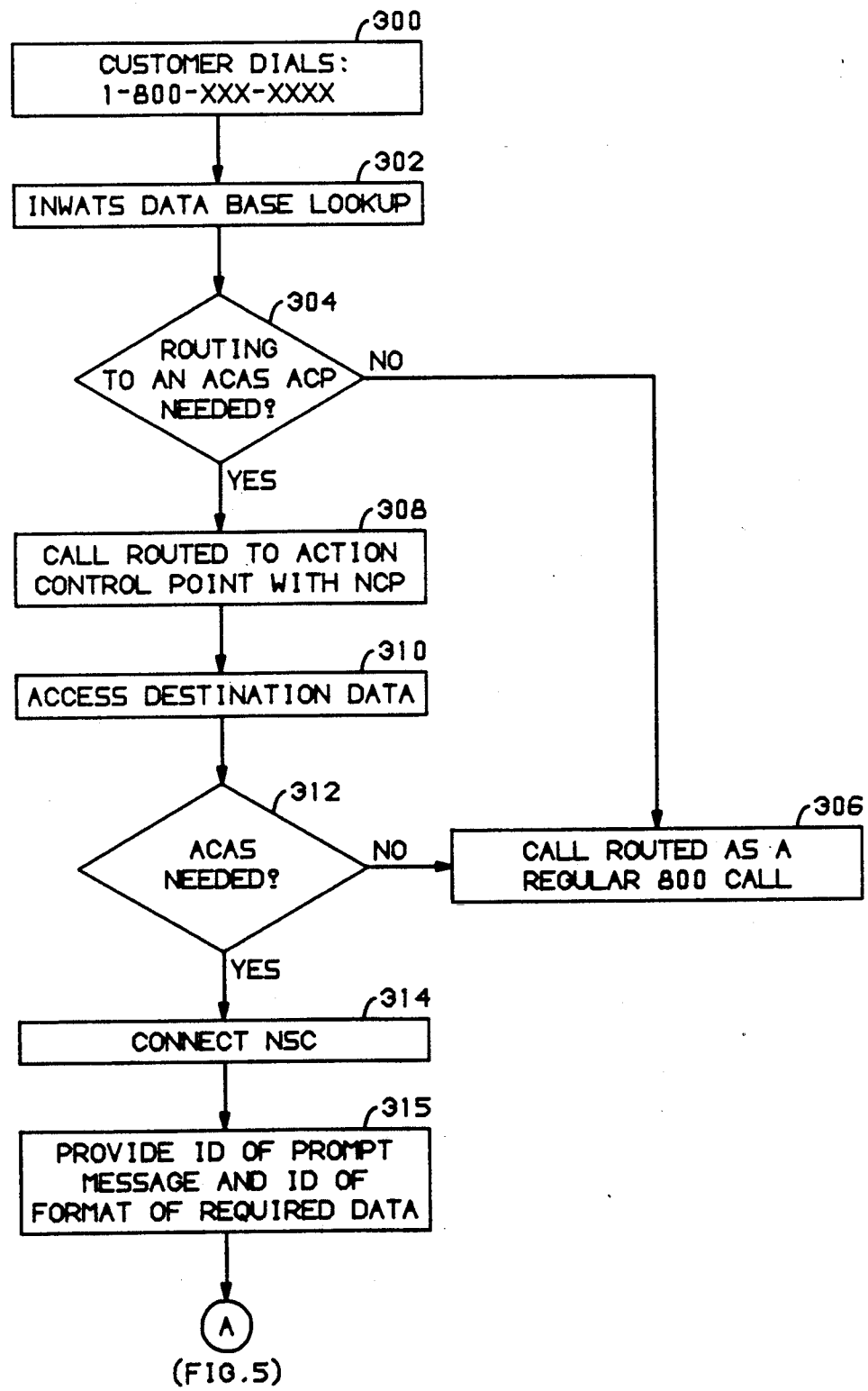
FIGS. 4-6 are flow charts of a process for practicing the invention.
Figure 5:
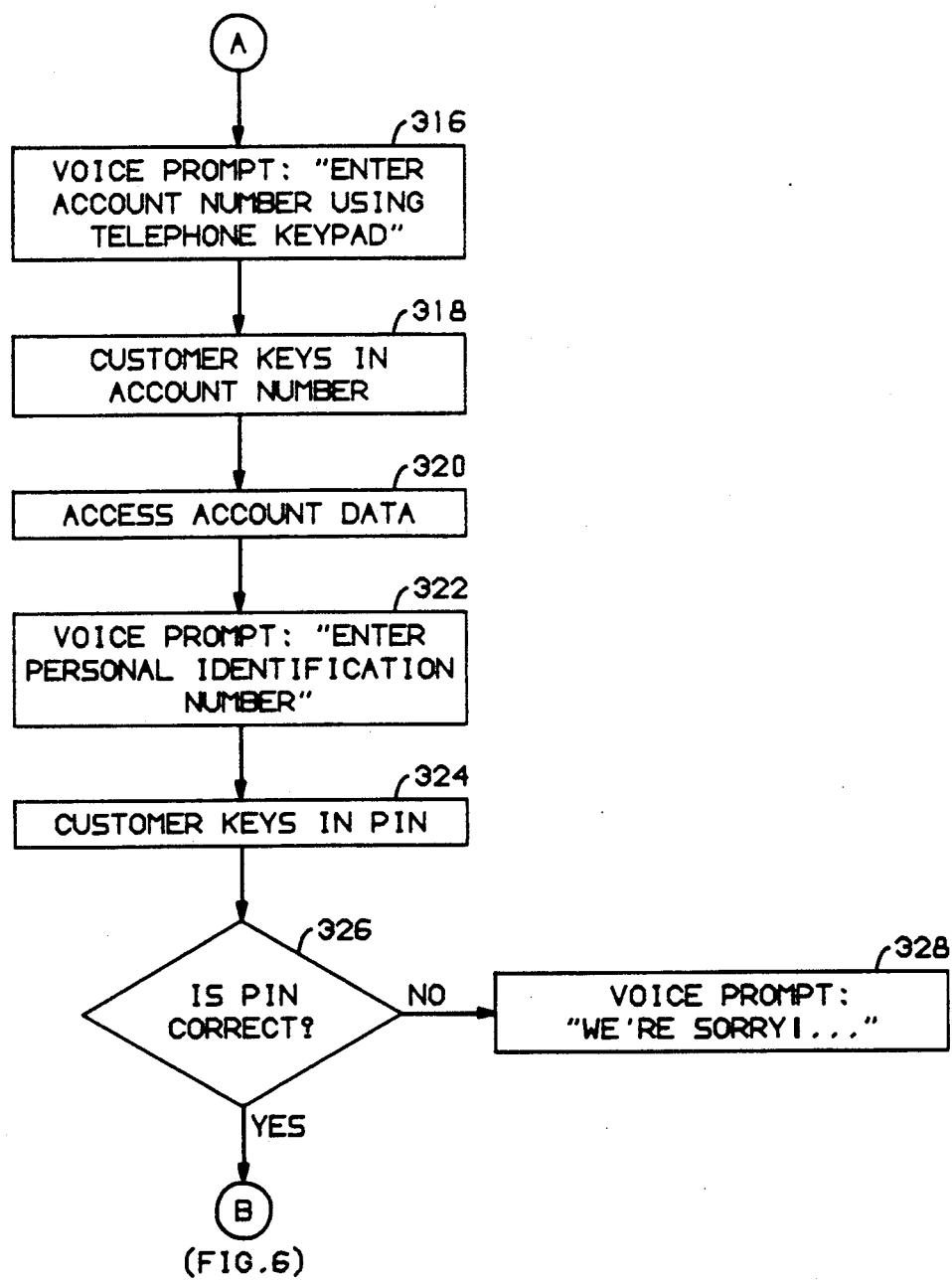
Figure 6:
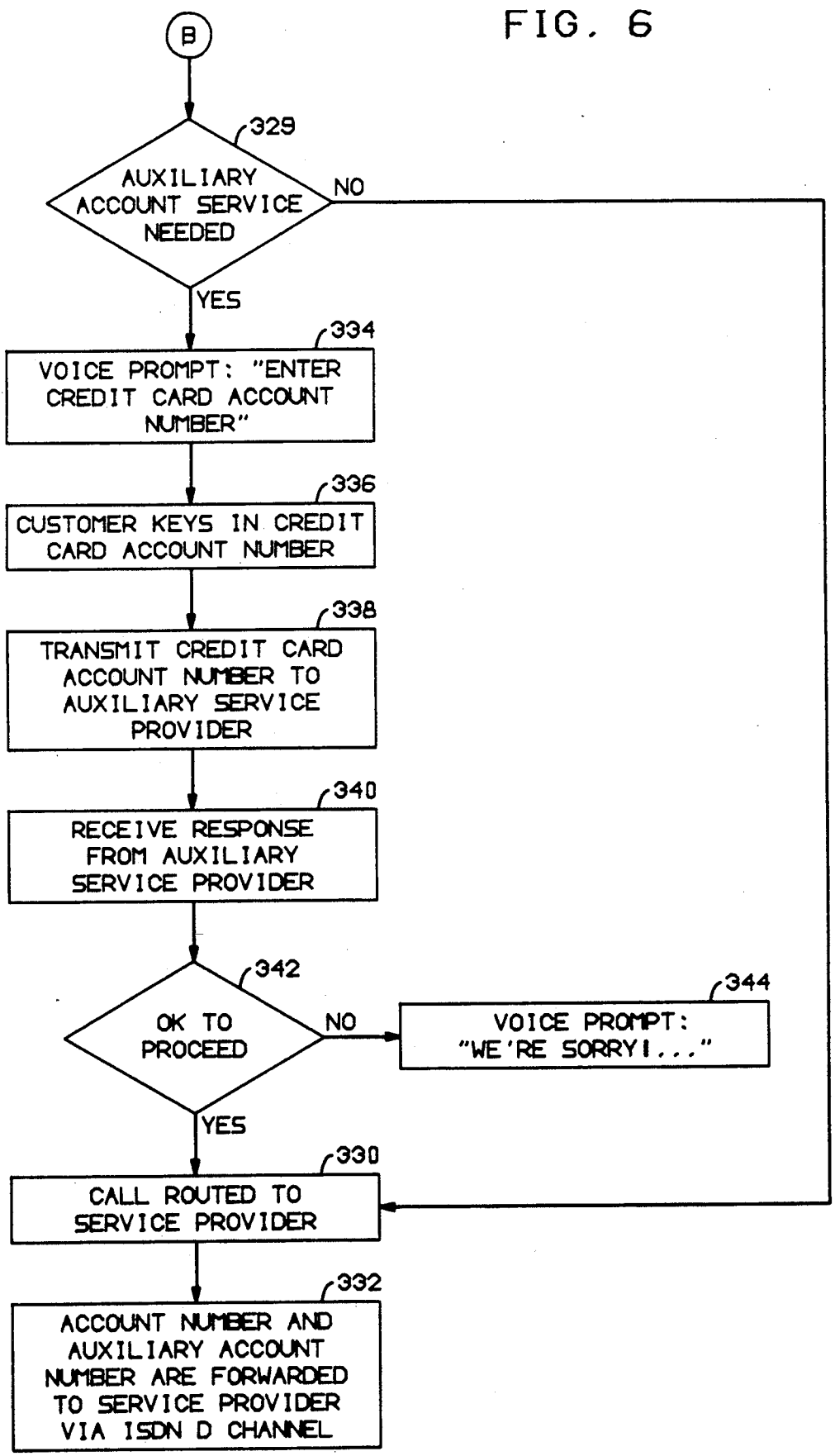

FIGS. 4–6 are flow diagrams of the actions required to implement this type of service. A customer dials an 800 number by dialing 1 800 followed by 7 digits (action block 300). This number is used to access an INWATS data base in order to obtain a NDDN used in routing the call and to obtain information as to whether the call is to be routed via an ACP equipped to handle authenticated communication access service (ACAS) calls. If the call is not being routed to such an ACP (test 304) then the call is routed as a regular 800 call (action block 306). If the call is routed to an ACP for handling ACAS calls, then it is routed to such an ACP equipped with a network services complex for providing announcements and for detecting customer responses (action block 308). The ACP then accesses destination data using the NDDN and the customer's ANI identification for this access (action block 310). If the accessed data indicates that ACAS is not needed (test 312) then the call is routed as a regular 800 call (action block 306). If ACAS is needed, then the call is connected to a network services complex (NSC) (action block 314). The NSC has provided the identification of a prompt message and the format of the data required from the customer (action block 315). The NSC then provides a voice prompt such as a request to enter an account number on a DTMF keypad (action block 316, FIG. 5). The customer keys an account number (action block 318) and the account data is accessed (action block 320) in order to obtain the customer's PIN. The voice prompt then requests the customer to enter the PIN (action block 322) and the customer enters the PIN (action block 324). If the correct PIN (i.e., the PIN that matches the PIN accessed in action block 320) has not been entered (test 326), a prompt is returned to the customer informing the customer that the PIN is incorrect (action block 328). If the correct PIN has been entered, test 329 (FIG. 6) determines whether auxiliary account service is needed. If not, then the call is routed to the service provider (action block 330) and the account number, other customer data obtained in action block 320, and the auxiliary service data, if appropriate, is forwarded to the service provider via an ISDN D-channel connected between the common carrier network and the service provider's terminal.

If auxiliary account service is needed on this call (test 329), then the network services complex gives a voice prompt to the customer to enter a credit card account number. The determination of whether auxiliary account service is needed is based on the data originally received from IND NCP 26, specifically, the auxiliary service indicator 59 of message 55. The customer keys in the credit card number in response to the voice prompt (action block 336) and the credit card number is transmitted to the auxiliary service providers terminal (action block 338) for credit card verification. The network services complex then receives the response from the auxiliary service provider (action block 340) and tests whether the response is positive. If the response is positive (test 342) then the call is routed to the service provider (action block 330) as discussed previously. In this case, the service provider is provided not only with a basic account number (corresponding to a customer identification) but also with the credit card account number (action block 332). If the response from the auxiliary service provider is negative, then the network services complex returns a voice prompt informing the customer that the call cannot be completed with a message such as "We're sorry . . . ".

It is to be understood that the above description is only of one preferred embodiment of the invention. Numerous other arrangements may be devised by one skilled in the art without departing from the spirit and scope of the invention. The invention is thus limited only as defined in the accompanying claims.

We claim:

1. A method of providing authenticated and authorized communications access to a called destination, comprising the steps of:
   in a switching office, responsive to receipt of a call comprising a called number identifying said destination, data identifying a caller, and authentication data, querying a data base means for accessing data, using said called number, said identifying data and said authentication data to verify authentication of said caller and authorization by said destination of access by said caller; and
   responsive to a positive verification response from said data base extending said call toward said destination;
   wherein said data identifying said caller comprises an automatically identified telephone number.

2. In a communications network, switching means comprising:
   means, responsive to receipt of a call comprising a called number identifying a destination, data identifying a caller and authentication data supplied by said caller, for transmitting at least one query message to a data base means for accessing data, for verifying authentication of said caller and authorization by said destination of access by said caller;
   means responsive to receipt of a positive verification response message from said data base means for extending said call toward said destination; and
   means for transmitting said data for identifying said caller to said destination.

3. In a communications network, switching means comprising:
   means, responsive to receipt of a call comprising a called number identifying a destination, data identifying a caller and authentication data supplied by said caller, for transmitting at least one query message to a data base means for accessing data, for verifying authentication of said caller and authorization by said destination of access by said caller;
   means responsive to receipt of a positive verification response message from said data base means for extending said call toward said destination; and
   wherein said positive verification response message comprises data for further identifying said caller, and said switching means further comprises:
   means for transmitting said data for further identifying said caller to said destination.

4. A method of providing authenticated and authorized communications access to a called destination, comprising the steps of:
   in a switching office, responsive to receipt of a call comprising a called number identifying said destination, data identifying a caller, and authentication data, querying a data base means for accessing data to verify authentication of said caller and authorization by said destination of access by said caller; and
   responsive to a positive verification response from said data base extending said call toward said destination;
   wherein said querying step comprises:
   sending a first data message comprising said called number, said data identifying said caller, and said authentication data to said data bases;

verifying in said data base means whether said authentication data matches authentication data for said data identifying said caller; and transmitting a verification message comprising caller data from said data base to said first switching system;

further comprising the steps of:

transmitting said authentication data comprising at least one dual tone multifrequency (DTMF) signal from a caller station to said switching office;

transmitting said data identifying a caller and said caller data to said destination over a facility of an integrated services digital network;

wherein said verification message comprises a non-dialable telephone number for extending said call to said destination;

wherein said data identifying said caller comprises an automatically identified telephone number.

5. The method of claim 4 wherein said data base means is organized to provide authorization data for each authenticatable user for said called number.

6. The method of claim 4 further comprising the step of:

prior to said querying step, populating said data base means with authorization data supplied by a customer associated with said destination.

7. A method of providing authenticated and authorized communications access to a called destination, comprising the steps of:

in a switching office, responsive to receipt of a call comprising a called number identifying said destination, data identifying a caller, and authentication data, querying a data base means for accessing data, using said called number, said identifying data and said authentication data to verify authentication of said caller and authorization by said destination of access by said caller, and responsive to a positive verification response from said data base extending said call toward said destination;

wherein said data identifying a caller is data identifying a calling card number or credit card number of said caller and wherein said authentication data is data other than data of said calling card or credit card.

8. A method of providing authenticated and authorized communications access to a called destination, comprising the steps of:

in a switching office, responsive to receipt of a call comprising a called number identifying said destination, data identifying a caller, and authentication data, querying a data base means for accessing data, using said called number, said identifying data and said authentication data to verify authentication of said caller and authorization by said destination of access by said caller, and responsive to a positive verification response from said data base extending said call toward said destination;

wherein said data identifying a caller is data identifying a telephone number of said caller and wherein said authentication data is data other than said data of said telephone number identifying said caller.

9. The method of claim 7 or 8 wherein said querying step comprises:

sending a first data message, said first data message comprising said called number, said data identifying said caller, and said authentication data from said switching office to said data base means;

responsive to receiving said first data message, verifying in said data base means whether said authentication data matches authentication data for said caller and whether said data identifying said caller matches caller authorization data for said called number; and responsive to said verifying, transmitting a positive or a negative verification message from said data base means to said switching office.

10. The method of claim 7 or 8 further comprising the step of transmitting said authentication data from a caller station to said switching office.

11. The method of claim 10 wherein said step of transmitting authentication data comprises:

transmitting at least one dual tone multifrequency (DTMF) signal from said caller station.

12. The method of claim 10 wherein said step of transmitting authentication data comprises:

transmitting at least one spoken command from said caller station.

13. The method of claim 7 or 8 further comprising the step of:

transmitting said data identifying a caller to said destination.

14. The method of claim 13 wherein said verification message comprises caller data, further comprising the step of:

transmitting said caller data to said destination.

15. The method of claim 13 wherein said step of transmitting said data identifying a caller comprises the step of:

transmitting said data identifying a caller to said destination over a facility of an integrated services digital network.

16. The method of claim 7 or 8 wherein said positive verification message comprises a routing number for extending said call to said destination.

17. The method of claim 16 wherein said number for extending is a telephone number not acceptable to a local switching office.

18. The method of claim 7 or 8 wherein said positive verification message comprises data for further identifying said caller, and further comprising the step of:

transmitting said further data to said destination.

19. The method of claim 18 wherein said data for further identifying said caller comprises a name or an account number.

20. The method of claim 7 or 8 wherein said authentication data is the same for a plurality of destinations accessed by said caller.

21. The method of claim 20 wherein said authentication data is a personal identification number.

22. The method of claim 7 or 8 wherein said authentication data comprises a password receivable from said caller.

23. The method of claim 7 or 8 wherein said authentication data comprises a voice sample receivable from said caller.

24. The method of claim 7 or 8 further comprising the step of:

prior to extending said call, calling back said caller.

25. The method of claim 7 or 8 wherein said data base means is organized to provide authorization data for each authenticatable user for said called number.

26. The method of claim 7 or 8 further comprising the step of:

prior to said querying step, populating said data base means with authorization data supplied by a customer associated with said destination.

27. A method of employing a communications network, for interconnecting a plurality of entities, to authorize a transaction, said transaction not related to establishing a communication path, comprising the steps of:

receiving a request from a first one of the entities connected to the communications network;

responding to the request by employing the communications network to obtain first information for authenticating the transaction from said first one of the entities;

employing the communications network to obtain second information for authorizing the transaction, using accessing data comprising said first information, from a data base; and employing said network to provide the second information to a second one of the entities connected to the network.

* * * * *